(12) United States Patent
Lye et al.

(10) Patent No.: US 6,451,098 B1
(45) Date of Patent: Sep. 17, 2002

(54) HIGH DYE LOADING INK JET INKS WITH IMPROVED COLOR DEVELOPMENT ON TEXTILES

(75) Inventors: Jason Lye, Atlanta, GA (US); Diane Vernice Graff, Escondido, CA (US); Mary Elizabeth Kister, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/969,902

(22) Filed: Oct. 3, 2001

Related U.S. Application Data

(60) Provisional application No. 60/240,128, filed on Oct. 13, 2000.

(51) Int. Cl.[7] .............................. C09D 11/02
(52) U.S. Cl. ................. 106/31.47; 106/31.58
(58) Field of Search ............... 106/31.47, 31.58

(56) References Cited

U.S. PATENT DOCUMENTS

| | | | |
|---|---|---|---|
| 5,133,803 A | 7/1992 | Moffatt ................. | 106/31.37 |
| 5,226,957 A | 7/1993 | Wickramanayake et al. ..... | 106/31.26 |
| 5,531,817 A | 7/1996 | Shields et al. ........... | 106/31.43 |
| 5,626,655 A | 5/1997 | Pawlowski et al. ....... | 106/31.27 |
| 5,785,745 A | 7/1998 | Lauw et al. ............. | 106/31.27 |
| 5,891,232 A | 4/1999 | Moffatt et al. ........... | 106/31.89 |
| 5,891,934 A | 4/1999 | Moffatt et al. ............. | 523/161 |
| 5,935,309 A | 8/1999 | Moffatt et al. ........... | 106/31.27 |
| 5,955,515 A | 9/1999 | Kimura et al. ............. | 523/161 |
| 6,090,193 A | 7/2000 | Nigam et al. ............ | 106/31.27 |
| 6,247,808 B1 * | 6/2001 | Ma et al. ................. | 106/31.27 |
| 6,372,818 B1 * | 4/2002 | Kimura et al. ........... | 106/31.27 |

FOREIGN PATENT DOCUMENTS

| | | | |
|---|---|---|---|
| EP | 0993778 A | | 4/1920 |
| JP | 63-105078 A | * | 5/1988 |
| JP | 2000-129179 A | * | 5/2000 |
| WO | 98/14524 | | 4/1998 |

OTHER PUBLICATIONS

English transaltion of JP2000–129179, May 2000.*
Japanese Abstract, JP 56–143,272 A; Nov. 7, 1981; Oota et al.
Japanese Abstract, JP 63–105,078 A; May, 10, 1988; Takimoto et al.
Japanese Abstract, JP 08–259,868 A; Oct. 8, 1996; Kimura et al.
Japanese Abstract, JP 2000–129,179 A; May 9, 2000; Seiko Epson Corp.

* cited by examiner

Primary Examiner—Helene Klemanski
(74) Attorney, Agent, or Firm—James B. Robinson; Steven D. Flack

(57) ABSTRACT

A water-based ink jet ink includes water, N-methylmorpholine-N-oxide co-solvent of the following structure,

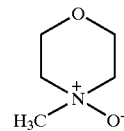

and at least 0.5 % by ink weight of a dye selected from the reactive, acid, basic or direct dye classes.

31 Claims, 1 Drawing Sheet

HIGH DYE LOADING INK JET INKS WITH IMPROVED COLOR DEVELOPMENT ON TEXTILES

This application claims benefit of provisional application No. 60/260,128 filed Oct. 13, 2000.

FIELD OF THE INVENTION

The present invention relates to ink jet inks. More particularly, the present invention relates to ink jet inks containing co-solvents.

BACKGROUND OF THE INVENTION

The ink jet method of printing is a rapidly growing, commercially important printing process because of its ability to produce economical, high quality, multi-colored prints. In fact, ink jet print methodology is becoming the print method of choice for producing colored hard copy of computer generated images consisting of graphics and fonts in both narrow and wide format. Ink jet printing is a non-impact and non-contact printing method in which an electronic signal controls and directs droplets or a stream of ink that can be deposited on a wide variety of substrates. Current ink jet printing technology involves forcing the ink drops through small nozzles by piezoelectric pressure, thermal ejection, or oscillation, and onto the surface of a material/media. Ink jet printing is extremely versatile in terms of the variety of substrate material that can be treated, as well as the print quality and the speed of operation that can be achieved. In addition, ink jet printing is digitally controllable.

For these reasons, ink jet printing methodology has been widely adopted for industrial marking and labeling. In addition, ink jet printing methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like. Finally, ink jet printing has now also been used to create an image on a variety of textile substrates such as cotton, silk and synthetic materials.

Both dyes and pigments have been used as colorants for such ink jet ink formulations. When dyes are used in ink jet inks (usually in the form of dye solutions), they rarely exceed concentrations of 4 weight percent (that is percent total dye solids) of the mass of the ink. In the case of water-based ink jet inks intended for textile applications, it is often desirable to increase the concentration of the dye solids to above 4 percent of the mass of the ink to obtain a deeply colored print on fabrics. In some cases, solid dye concentration may exceed 10 percent of the ink mass. At this level of solid dye concentration, it has proven a challenge to incorporate large amounts of dye into ink jet inks while maintaining good ink jetting properties and useful ink shelf life. In particular, ejection of ink with high levels of dye leads to ink jet blockage and relatively low/short shelf lives as a result of particulate buildup/precipitate in the ink. Ideally, such inks should have shelf lives of at least between 9 and 24 months for the ink manufacture to be practical. Ink jet blockage may be reflected in delayed ink jetting from the ink jet printer. For the purposes of this application, the term "jetting" shall refer to the expulsion of ink from an ink jet printer head.

Although several compounds can be used as co-solvents, or additives in ink jet inks, to allow high dye loading with certain dyes, the printing and ink stability is often affected. For instance, the printed image may include breaks, or the image color intensity may be reduced, as seen through visual observation. For the purposes of this application, the term "high dye loading" shall refer to an ink containing a dye content in excess of about 4 percent of the ink mass, that is a dye solids content in excess of about 4 percent of the ink mass.

In addition to preventing jetting problems, it is particularly advantageous if materials contained in the ink cause the image produced on a particular substrate to be visually brilliant (bright). Materials may cause brightening of a dye by several mechanisms, including but not limited to causing the substrate to swell, thus allowing improved penetration of colorants into the substrate. An alternate possible mechanism for improving the color of a printed image of the substrate may involve preventing the individual dye molecules from associating with one another in the ink to form microscopic aggregates. It is well known that as dye molecules associate to form aggregates, the resulting color becomes duller. Thus, it is seen that in addition to preventing jetting problems through cosolvents, there is a need for certain cosolvents which also impart other advantages to the ink with respect to the color of the ink when printed on to the substrate.

It is therefore seen that there is a need for ink jet inks which allow for high dye loading without sacrificing print quality, ink jetting operations, print color brightness, or shelf life. There is also a need for methods of ink jet printing using ink jet ink with high dye loading capability. In particular, there is a need for methods of ink jet printing textiles, using ink jet ink with high dye content (loading). It is to such needs that the present invention is directed.

SUMMARY OF THE INVENTION

A water-based ink jet ink in accordance with one embodiment of the invention includes an N-methylmorpholine-N-oxide (NMMO) co-solvent that allows large amounts of dye (solid dye content in the ink of 4 to 20 percent) to be used in the ink, without compromising ink jetting properties, and while maintaining the stability of the ink for a longer shelf life, and while producing prints with visually brighter color. It should be appreciated that the water-based ink with co-solvent of the present invention can be used with a solid dye content in the ink of less than 4 percent by weight as well. The invention also relates to methods of ink jet printing using ink jet ink with NMMO co-solvent and high dye content of greater than about 4 percent by weight. Desirably, the invention relates to methods of ink jet printing textiles using water-based ink jet ink with NMMO co-solvent and a dye content of greater than about 4 percent. The ink is desirably a reactive, direct, basic, or acid dye-based ink. Furthermore, such formulations, may include at least one additional co-solvent such as an N-methyl acetamide, N-methyl pyrrolidone or tetramethylene sulfone. When included at levels of 0.5–20 percent by weight in a reactive or acid dye-based ink, NMMO allows dye loading to be increased to about 10 percent or more of total dye solids in the ink jet ink, and gives rise to advantageous improvements in the visual appearance of prints when compared to other cosolvents that may be used.

DETAILED DESCRIPTION OF THE INVENTION

Figure 1:
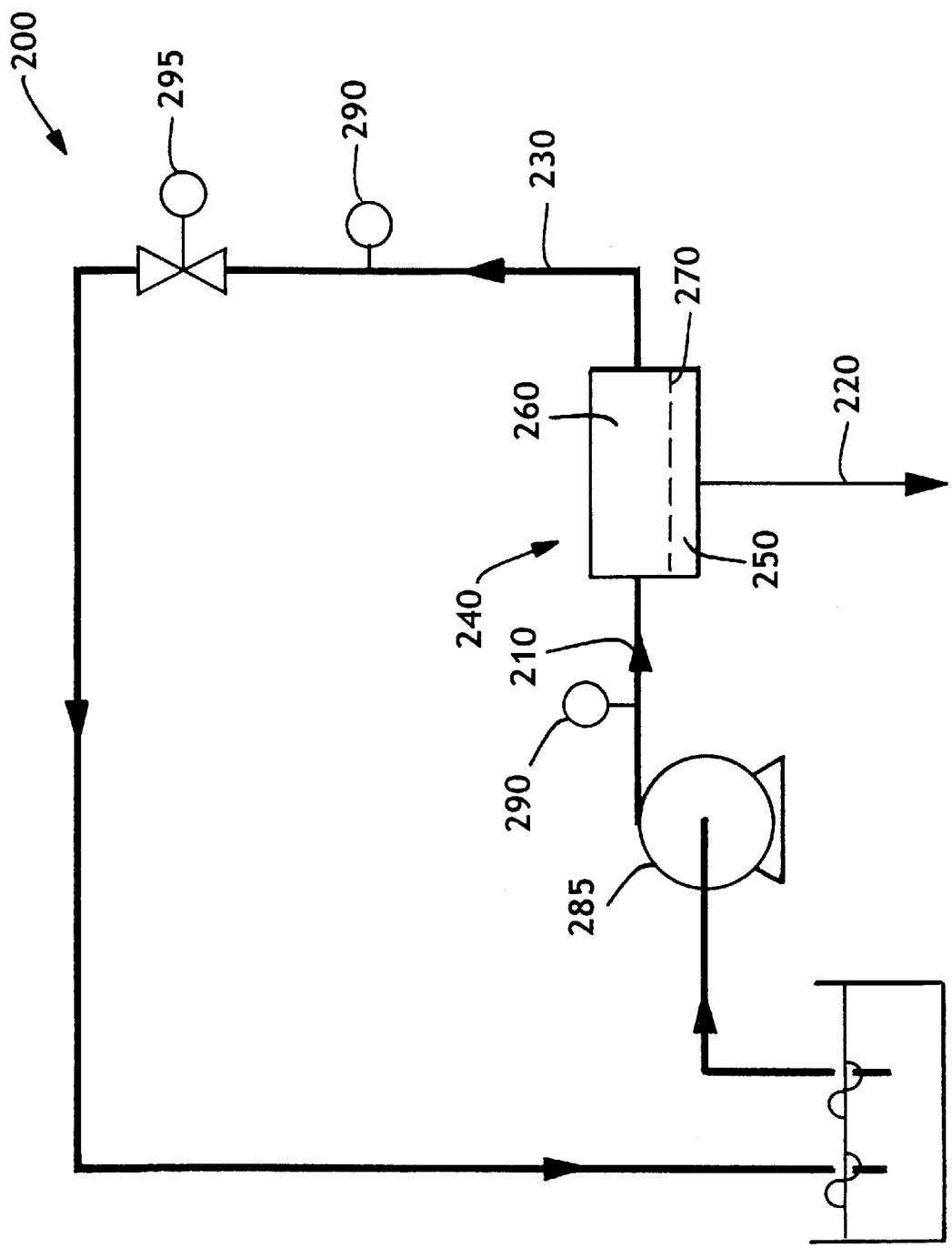
FIG. 1 shows an exemplary embodiment of a purification system useful in the present invention.

An ink jet ink containing NMMO co-solvent allows for ink to be ejected from an ink jet printer head without print head blockage and with improved shelf life. In addition, it has been found that inks containing NMMO give visually brighter prints when printed onto fabric and steamed. Such ink jet inks contain water as the principal solvent, preferably deionized water in a range of between about 20.0 to 95 percent by weight, an NMMO co-solvent in an amount of between about 0.5 and 20.0 percent by weight, and a dye, and in particular a reactive or acid dye, in an amount of between about 0.5 and 20 percent by weight of dye solids in the ink, desirably greater than 4.0 percent dye solids. Optionally a humectant(s) in an amount between about 0.5 and 20 percent by weight may be included in the ink formula. Further, other co-solvents in an amount of between about 1.0 and 12.0 percent by weight may be added to the formulation.

Other additives may also be included to improve ink performance, such as a chelating agent to sequester metal ions that could become involved in chemical reactions that could spoil the ink over time, particularly for use with metal complex dyes, a corrosion inhibitor to help protect, metal components of the printer or ink delivery system, a biocide or biostat to control unwanted bacterial, fungal, or yeast growth in the ink, and a surfactant to adjust the ink surface tension. However, the use of a surfactant may be dependent on the type of printhead to be used. If a surfactant is included, it is desirably present in an amount of between about 0.1 to 1.0 percent by weight. If a corrosion inhibitor is included, it is desirably present in an amount between about 0.1 and 1.0 percent by weight. If a biocide or biostat is included, it is desirably present in an amount between about 0.1 and 0.5 percent by weight.

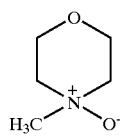

(1)

The co-solvent N-methylmorpholine-N-oxide (1 above) (NMMO) may be obtained from Aldrich Chemical Co. Inc., of Milwaukee, Wis. When included at levels of 0.5 to 20 percent by weight in a reactive or acid dye ink, desirably 1.0 to 12 percent weight, NMMO allows dye loading to be increased to about 10 percent of dye solids in the ink jet ink. Other names for pure NMMO include CAS Registry number 7529-22-8, 4-methylmorpholine-4-oxide, 4-methylmorpholine-N-oxide, 4-methylmorpholine oxide, N-methylmorpholine-N-oxide, and NMO. As NMMO strongly associates with water, it is often supplied in a hydrated form, for instance, as the disesquihydrate (CAS Registry 80913-65-1), N-methylmorpholine-N-oxide hydrate (2:5), CAS registry number 172158-61-1 (Morpholine, 4-methyl-, 4-oxide, mixture with water), CAS registry number 80913-66-2 (a mixture of NMMO and water in an unspecified ratio), CAS registry number 70187-32-5 (4-methylmorpholine 4-oxide monohydrate), CAS registry number 85489-61-8 (N-methylmorpholine oxide dihydrate). In fact, the association of NMMO with water allows NMMO to act as a humectant, as well as a cosolvent.

Optionally, additional humectants for use in the formulation include ethylene glycol, diethylene glycol, glycerine, and polyethylene glycol 200, 400, and 600, propane 1,3 diol, other glycols, a propyleneglycolmonomethyl ether, such as Dowanol PM from Gallade Chemical Inc. of Santa Ana, Calif., and polyhydric alcohols. As previously stated, numerous humectants may be included in the formulation.

Reactive dyes that can be added to the ink formulation may be obtained from companies such as BASF, DyeStar, Clariant, and Ciba. Acceptable reactive dye classes include for example, monochlorotriazine, monofluorotriazine, tetrachloropyrimidine, 2,3-dichloroquinoxaline, dichlorophthalazine, 5-chlorodifluoropyrimidinyl, β-sulfatoethylsulfamoyl, β-chloroethylsulfamoyl, sulfatoethylsulfone, and vinyl sulfone reactive dyes, although essentially any reactive dye could be used. Examples of reactive dyes useful in the present invention include, but are not limited to, Cl Reactive Yellow 7, Cl Reactive Yellow 18, Cl Reactive Yellow 22, Cl Reactive Yellow 55, Cl Reactive Yellow 86, Cl Reactive Orange 4, Cl Reactive Orange 12, Cl Reactive Orange 13, Cl Reactive Orange 35, Cl Reactive Orange 66, Cl Reactive Red 2, Cl Reactive Red 3, Cl Reactive Red 5, Cl Reactive Red 6, Cl Reactive Red 11, Cl Reactive Red 31, Cl Reactive Green 8, Cl Reactive Blue 4, Cl Reactive Blue 5, Cl Reactive Blue 9, Cl Reactive Blue 13, Cl Reactive Blue 49, Cl Reactive Blue 63, Cl Reactive Blue 71, Cl Reactive Blue 72, Cl Reactive Blue 62, Cl Reactive Blue 96, Cl Reactive Blue 99, Cl Reactive Blue 109, Cl Reactive Blue 122, Cl Reactive Blue 140, Cl Reactive Blue 161, Cl Reactive Blue 162, Cl Reactive Blue 163, Cl Reactive Blue 166, Cl Reactive Blue 198, Cl Reactive Violet 1, Cl Reactive Brown 9, Cl Reactive Brown 10, Cl Reactive Brown 17, Cl Reactive Brown 22, Cl Reactive Brown 23, Cl Reactive Black 8, and Cl Reactive Black 14. This list is meant to be exemplary and not exhaustive, and additional examples are described in the formulation trial examples which follow. For the examples which follow, the Procion dyes were obtained from BASF Corp. of Charlotte, N.C., and Cibacron Dyes were obtained from Ciba Specialty Chemicals Corp., Highpoint, N.C.

Acid dyes which are useful in the present invention may be obtained from companies such as the Morlot Corporation, and include, but are not limited to, Cl Acid Yellow 3, Cl Acid Yellow 5, Cl Acid Yellow 23, Cl Acid Yellow 36, Cl Acid Yellow 73, Cl Acid Yellow 210, Cl Acid Orange 7, Cl Acid Orange 8, Cl Acid Orange 60, Cl Acid Orange 63, Cl Acid Orange 142, Cl Acid Red 52, Cl Acid Red 87, Cl Acid Red 357, Cl Acid Green 1, Cl Acid Green 26, Cl Acid Blue 9, Cl Acid Blue 254, Cl Acid Violet 90, Cl Acid Brown 26, Cl Acid Brown 268, Cl Acid Brown 269, Cl Acid Black 194, and Cl Acid Black 210. As in the Reactive dye list, this list is for meant to be for example only and is not intended to be limiting in any way.

Typically, standard commercially available dyes contain impurities supplied with the dyes that prevent them from being used directly in a digital printing system, such as an ink-jet printing system. Custom purification is therefore usually required to allow the standard dyes intended for textile dyeing and screen printing to be used in a digital printing system. The purification removes from the dye solution materials that prove detrimental to ink stability and ink performance in both the printhead and print quality. Once the dyes have been selected, they are then purified and formulated into purified dye stock solutions, prior to being introduced into the solvent mix. These purified dye stock solutions are formed by using a purification system designed to remove the undesirable contaminants. However, some of the impurities located within a dye are beneficial, such as salts, which are used as pH buffers. Therefore the purification system is preferably designed to remove only those impurities which adversely affect the quality of the purified dye stock solution. After the impurities are removed, the dyes are formulated into purified dye stock solutions by mixing the purified dyes with water and optionally buffer materials such as citric acid from Aldrich Chemical Company Inc., Milwaukee Wis., acetic acid from Aldrich Chemical Co Inc, AMP-95 from Angus Chemical Company, Buffalo Grove, Ill. or triethanolamine (TEA) from Union Carbide Chemicals and Plastics Co. Inc., of Danbury, Conn., in order to keep the solutions stable prior to being formed into ink-jet inks. If these materials are used, they are used in quantities of less than 1.0 percent by weight of the dye solution. Examples of purification systems useful in purifying such inks include filtration, ion exchange, precipitation, electrodialysis, and centrifugation. However, a desirable purification system is the filtration system.

There are several filtration methods that may be used with the present invention, including, but not limited to, crossflow filtration and throughflow filtration, of which the desired method is crossflow filtration. Both methods can be used to separate different types of species, ranging from large particles to small molecules and ions. The type of species to be separated determines the type of membrane system to be used. These membrane systems include, but are not limited to, microfiltration, ultrafiltration, nanofiltration, and reverse osmosis. Because dye molecules are mid-sized molecules (molecular weight of about 500), it is preferred to select a filtration system that can remove both large particles and small molecules. Moreover, because not all of the impurities in a dye are detrimental to its performance as an ink, the system should be capable of removing certain impurities, and leaving the beneficial ones behind. Finally, it is desirable to select a filtration system that will minimize the risk of clogging and degradation of the membrane. For these reasons, a preferred filtration system is a crossflow membrane filtration system (also known as dialysis).

As shown in FIG. 1, in a cross-flow membrane filtration system 200, the dye undergoes a two step process. In the first step, a membrane 270 is chosen which uses size exclusion to remove the larger impurities. In the second step, a different membrane 270 is chosen which is capable of removing the smaller sized impurities.

The cross-flow membrane filtration system 200 comprises a dye inlet 210, a first outlet 220, and a recirculation outlet 230. The system 200 also includes a cross-flow filtration area 240 which includes a lower plate 250 and an upper plate 260 which sandwich the membrane 270. Bolts or other fastening means are used to ensure that the membrane 270 remains in place during the filtration step since the dyes are usually filtered at elevated speeds and pressures, which create significant forces upon the membrane 270. Additionally, a pump 285, pressure gauges 290 and pressure regulating valves 295 may be used to control flow of the fluids through the system 200. The output from the first outlet 220 and the recirculation outlet 230 will change depending upon which filtration step is occurring. During the first filtration step, the larger particles are trapped by the membrane 270 and are recirculated to the recirculation outlet 230 where they are removed. The partially purified dye and smaller particles pass through the membrane 270 and out through the first outlet 220. In the second filtration step, a second membrane 270 is used which has a different pore size and selectivity characteristics. During this step, the smaller impurities and water pass through the membrane 270 and exit the system 200 through the first outlet 220. The impurity laden water that has exited the system is replaced with clean distilled water. The addition of clean water to replace impure water is typically known as diafiltration. Purified dye is trapped by the membrane 270 and passes through to the recirculation outlet 230 along with the clean water, where it is collected in a container (not shown) and mixed with water and buffers to produce the purified dye stock solution.

Alternatively, the filtration apparatus may be designed such that the two different membranes 270 are arranged in series, which the larger pore size membrane located in the first position. The filtration apparatus would then include three outlets. Materials not passing through the first membrane would be discarded through the first outlet as these materials would comprise the larger impurities. Materials passing through the second membrane would be discarded through the third outlet as comprising the smaller impurities. The purified dyes would be removed from the second outlet.

The membranes 270 used are mainly chosen based upon their pore size. However, the membranes 270 are also preferably able to be modified, such as by pH adjustment, to selectively keep or remove only some of the impurities, thereby allowing the beneficial impurities to remain in the dye solution. Preferably, the microfiltration membranes used for crossflow filtration are SUPOR™ membranes. They are polyethersulfone membranes manufactured by Gelman Sciences in Ann Arbor, Mich., and are distributed by VWR Scientific Products. The pore size of the microfiltration membranes is desirably 0.2 $\mu$m.

Additionally, ultrafiltration membranes for crossflow filtration may be obtained from Separation Technology, Inc. in Rock Hill, S.C. under the designations G5, G10, and G20. These thin film composite membranes are composed of two layers: a thin film of membrane at the top which is responsible for actual separation, and a comparatively thicker layer of backing material at the bottom which provides support. The G5, G10, and G20 membranes are rated at different molecular weight cutoffs. However, it must be kept in mind that molecular weight cutoffs should be used as guidelines and not as absolute boundaries. The G5 will have the lowest amount of passage and the G20 will have the highest amount of passage. It has been determined that a large percentage (95–99%) of dye molecules are retained by these particular membranes.

Additional co-solvents may also be included in the ink formulation. Examples of such additional co-solvents include a lactam such as N-methyl pyrrolidone. However, other examples of optional co-solvents include N-methylacetamide, N,N-dimethylacetamide, N-methyl formamide, propyleneglycol-monomethylether, tetramethylene sulfone, and tripropyleneglycolmonomethylether. Still other solvents which may be used include propylene glycol and triethanolamine (TEA). If an acetamide-based cosolvent is also included in the formulation it is desirably present at about 5 percent by weight, within a range of between about 1.0–12 percent by weight.

If a biocide or biostat is added to the ink formulation, it may be exemplified by Proxel GXL from Zeneca Corporation of Wilmington, Del. Other examples include Bioban DXN from Angus Chemical Company of Buffalo Grove, Ill. If a corrosion inhibitor is added to the formulation, it may be exemplified by Cobratec available from the PMC Specialty Group Distributing of Cincinnati, Ohio. Alternate corrosion inhibitors include sodium nitrite, triethanolamine phosphate, and n-acyl sarcosine. Still other examples include benzotriazole from Aldrich. If a surfactant is included in the formulation, it is desirably a nonionic surfactant exemplified by Surfynol 504 available from Air Products and Chemicals, Inc. of Allentown, Pa. Still other examples include Surfynol 465, and Dynol 604 also available from Air Products. If a chelating agent is included in the formulation it may be exemplified by an ethylene diaminetetraacetic acid (EDTA). Other additives such as pH stabilizers/buffers, (such as citric acid and acetic acid as well as alkali metal salts derived therefrom), viscosity modifiers, and defoaming agents such as Surfynol DF-65, may also be included in the formulation, depending on the product application.

It should be appreciated that final ink characteristics, eg. viscosity and surface tension, will vary according to the printhead used, and the platform, format desired. Such physical characteristics can be modified to accommodate the same ink for various print heads without undue experimentation. For instance, should the surface tension need to be adjusted, additional/alternate surfactants may be used in the formulation. If the viscosity needs to be increased, then a viscosity builder such as polyethyleneglycol may be added to the formulation.

In order to produce a high dye loading ink jet ink with NMMO co-solvent, the co-solvents are first mixed with water. The other non-dye components are then added to the formulation, stirred and heated to between about 30° and 50° C., desirably around 40° C., for between 30 minutes to 2 hours, desirably for about 1 hour. If an ethylene diamine-tetraacetic acid (EDTA) is added to the formulation as a chelating agent, the heated formulation is stirred until the EDTA dissolves. The dye component is then added to the mixture. As has already been described, prior to adding the dye component to the mixture, it is preferable that the dye is in solution form first, subject to dialysis treatment in order to remove unwanted salts which could cause coagation on the print head and thereby clog the print head jets.

In certain inks, such as those that include blue dyes and dyes that contain a complexed metal atom in their structure, chelating agents may be desirable in the ink formulation. Such a chelating agent or sequestering agent, is exemplified by Versene 100 XL, with the Versene 100 XL being a tetrasodium salt of EDTA in NaOH. A disodium EDTA in dry form may also be used. These materials give a moderate pH of below 8.0 and are obtained from Dow Chemical, of Midland, Mich. When the Versene 100 XL is used, it is desirably used in an amount of between about 0.1 and 1.5 percent by weight. When EDTA is used, it is desirably used in the range of about 0.1 and 1.0 percent by weight. An alternative chelating agent includes Dissolvine H-88X from Akzo Nobel of Nashua, N.H. and Chicago, Ill.

With reactive inks, including those containing monochlorotriazine reactive dyes, the pH is preferably between about 6 and 8. For inks including a vinyl sulfone reactive dye, the pH is preferably between 4 and 6. If the pH needs to be modified, it can be modified by adding triethanolamine (TEA) or 2-amino-1-hydroxy-2-methylpropane (or hydroxy-tert-butylamine) exemplified by AMP-95, to the mixture. Such would desirably be added in between about 0.05 and 5 percent by weight. Other acceptable pH modifiers include citric acid, acetic acid, tartaric acid and hydrochloric acid.

Following the mixing steps, heat is maintained on the mixture at between about 30° and 50° C., desirably at about 40° C. for between about 15 minutes and 2 hours, but desirably about 1 hour. The mixture is allowed to cool and then filtered through multiple membranes. Desirably, the ink is filtered first through a 0.45 micron membrane and then a 0.2 micron membrane. Following ink production, the ink can be placed in an ink jet printer cartridge, such as a Colorspan cartridge, Colorspan part number 0900400-300, and inserted into an ink jet printer, such as a Colorspan DM-XII thermal ink jet printer. Alternative printers include Epson Color Stylus 3000 of Seiko-Epson Corp. Japan, Encad Novajet PRO 600e, using Encad 600 dpi cartridges, Encad 60e printers using Encad 300 dpi cartridges, Encad 42e printers, using Encad 300 dpi cartridges, and Encad 1500tx printers, using Encad 300 dpi cartridges, each available from Encad of San Diego, Calif.

The Colorspan printer should be operated as further described in the examples which follow. For printers that are to be used for printing on textile substrates, the print modes should be set to provide approximately 200 percent saturation of the ink on the substrate.

Test Methods

Ordinarily, incorporating large quantities of dye into an ink jet ink gives rise to several problems. The term "ink stability" is used to describe changes that occur in the ink during storage or thermal stress. These changes may be, but are not limited to, i) microscopic, or even macroscopic particulates forming in the ink on standing, or when stored at elevated temperatures (e.g. 50° C.), ii) 'startup', which refers to a printing problem whereby the ink does not begin printing when the cartridge is first fired (that is, sent a signal to eject an ink droplet), and takes several lines of printing before solid images can be produced, iii) 24, 48, hour, etc. startup, whereby, after a period of idleness, inks contained in the printer cartridges fail to start up immediately when printed, iv) pH changes, v) viscosity or surface tension changes, vi) other changes in the physical, chemical, or printing properties of the ink.

The stability of an ink may be tested by placing a sample of the ink in an oven at 50° C. The ink is characterized for pH before placing in an oven, such as by using the Orion Model 420 A electronic meter obtained from Orion Research Inc., of Boston, Mass. A filtration test adapted from ASTM Standard D4189-82 to check the silt level of rivers, ponds and streams, may then be used to monitor changes in the levels of particulates in inks over time, as the ink is stored at 50° C.

The adapted Filtration Test (accelerated aging test) procedure is as follows: A 25 mm stainless steel filter funnel of 50 ml capacity is fitted onto a 250 ml filter flask. A 25 mm, 0.45 micron Pall Ultipor membrane filter disc obtained from the Pall Corporation is secured in the filter funnel. The filter membrane is then wetted with deionized water. A vacuum line fitted with a vacuum gauge is attached to the apparatus to give a vacuum of 23 inches Hg. 20 ml of ink is measured using a graduated cylinder, and poured into the top of the filter assembly all at once. The time taken for all of the ink to pass through the filter is then measured to the nearest hundredth of a second. This time is designated as T1. 160 ml of additional ink is then filtered through the same membrane without timing. Finally, a 20 ml portion of ink is filtered through the apparatus. This time taken for the final 20 ml of ink to pass through the filter membrane is designated T3. The Filtration Index (FI) is calculated from T1/T3. A decrease in the FI of an ink (after storage at 50° C. in the oven for 3 days or a week) indicates an unstable ink, in which particles are forming. Preferably the ratio T1/T3 is approximately $\geq 0.80$. More desirably, the ink should have a filtration index above 0.90 to ensure longevity. Essentially, if the ink filters within a certain period of time, it passes the test. These conditions may be comparable to 4 months of ambient temperature aging. It should be noted however, that even if the filtration ratio is above the 0.80 value, a visual inspection of the filter membrane is routinely performed to check for accumulation of larger particles (e.g. crystals) that do not clog the membrane openings, but which would interfere with print performance. The filter membrane may be scraped using a chemical weighing spatula to assist inspection for solids. If solids are visible, an ink would fail the filtration test, even though the index may be greater than the 0.80 value.

Specifically, for the examples which follow, a 300 ml sample of the reactive textile ink was heated in a Blue M. Electric Company convection oven at 50° C. for 3 days, one week, or two weeks, and then removed and cooled to room temperature. Alternatively, a Yamato DX300 convection oven, a Thelco Precision Scientific oven, or a GCA Corporation Precision Scientific Group oven could have been used for the heating step. The ink was then filtered in a timed filtering operation as previously described, and the filter was examined for particle buildup.

Print capability refers to the ability of an ink to be used in an ink jet printer. It may be measured by the print test method which follows. Ideally, an ink should be ejected from a print head as soon as it is electronically activated, that is, as soon as the signal is sent to the printhead to eject the ink droplet. Inks that do not eject from the head until a large number of firing impulses have been sent are said to have "poor startup". Inks that are ejected with the first impulses to the head are said to have "good startup". Startup is tested by printing a 4 mm strip running in the media feed direction of a printer. The media used could be a textile, or other substrates, such as photoglossy paper. Inks with good startup will begin printing on the strip immediately, whereas those with poor startup will only begin printing after several millimeters of media have passed underneath the print head. In a further print test, large blocks can be printed as opposed to narrow strips, to detect print banding and skipping.

Color measurement refers to the interpretation of the visual sensation of color in terms of three numbers that can be used to objectively assess and quantify differences in color between objects. Instruments are available that measure the spectrum of light reflected from the surface of an object and translate this spectrum into a series of numbers that pertain to visual color sensations. For instance, the subjective term 'brightness' may be quantified using the objective quantity 'luminance' obtained using a color measuring instrument. Color is measured by taking printed fabric, steaming the print, allowing the print to cool and dry, and then offering the printed area to the measuring aperture of a Hunter Spectrophotometer with a Miniscan XE 45/0 measuring head (manufactured by Hunter Associates Laboratory, Inc., 11491 Sunset Hills Road, Reston, Va. 22090.) using normal operating procedures as described by the manufacturer. As the fabric used was not entirely opaque, the sample was placed upon a standard white calibration tile (Hunter Associates Laboratory, Inc.) during measurement. As the visual sensation of color depends upon many things, including the type of light source (e.g., direct sunlight, tungsten filament light, etc.) used to view the object, as well as the amount of the observer's field of vision that the object occupies, these parameters must also be specified when measuring color. Colorimetric data were obtained using a D65 illuminant and 10 degree observer settings.

In the present invention, NMMO was incorporated into ink jet inks at various levels. The inks showed good startup and stability in a 1 week or 3 day 50° C. heat/filtration test. In addition, prints made using inks containing NMMO gave visually brighter colors when printed onto fabrics and steamed. The co-solvent containing inks are represented by the following examples. In the examples, percents are by weight unless otherwise stated.

The dyes in the examples were obtained from BASF and Ciba in liquid form, and were processed to remove excessive salts by Separation Technology, Inc. of Rock Hill, S.C. Processing took the form of subjecting the dye to a crossflow membrane dialysis using ultrafiltration or nanofiltration membranes, preferably supplied by Desal Inc. of San Diego, Calif. The filters are designated G5, G10, or G20, with G10 being desirable. The operating conditions for the crossflow filtration were as follows. The dye solution was pumped across the membrane at a flow rate of 1 gallon per minute, but could be higher or lower, at a pressure of between 200–800 psi. A range of 300–500 psi is desired. Deionized water is added to the dye solution to replace fluid that passes through the membrane. The dye is deemed to have been sufficiently processed when the permeate conductivity falls to an asymptopic level. Once the dye was filtered using the cross flow membrane, it was mixed with the other components as previously described, and loaded in cartridges, in this case, Colorspan 0900400-300 cartridges, and printed with a Colorspan DM XII printer.

The inks were mixed in the component order that they appear. All of the non-dye ingredients were typically mixed together for about 20 minutes at 40° C. until all solids had dissolved. The appropriate dye(s) solution was then added and the mixture stirred for one hour at 40° C and allowed to cool to room temperature. The mixture was then filtered through at least a 0.2 micron filter (vacuum filter). Typically, inks were filtered first through a 0.45 micron membrane (Ultipor N 66, Pall Corporation, Ann Arbor, Mich.) followed by a 0.2 micron membrane (Nylaflo 47 mm 0.2 micron, from Pall Corporation).

The filled Colorspan 0900400-300 cartridge was loaded in the Colorspan printer. The printer settings were 12 color, 8 pass mode at 200 percent ink laydown. A coated paper-backed cotton poplin material (basis weight of 6.5 oz/sq.yd, obtained from the Kimberly-Clark Corporation under the designation Kimberly-Clark Cotton Poplin 133×72 plain weave, was fed into the printer for printing and then printed. The paper included an adhesive and had been laminated to the material backing for processing through the printer. The paper backing is available from American Builtrite under the designation 6798. The laminate is available from Kimberly-Clark Corporation of Roswell, Ga. under the designation cotton poplin/Gen. 2. The laminate is further described in U.S. application Ser. No. 09/526,831 assigned to the same Assignee and incorporated by reference in its entirety. For visual comparison, two samples of each color were printed, one with an ink including the co-solvent system of the present invention, the other without the co-solvent system of the current invention. The backing was removed from the printed fabric, and the fabric was steamed for 25 minutes at 100° C. using a Jacquard Vertical Steamer. Prints were compared visually and by color measurement.

The present invention is further described by the specific trial examples which follow. Such examples, however, are not to be construed as limiting in any way either the spirit or the scope of the present invention. Unless stated otherwise, all percents are percents by weight. For the purposes of the examples, the total percent solids of the dye solution (after desalination as previously described) was measured and calculated as follows:

On an analytical balance (0.1 mg accuracy), a measurement dish was weighed and tared and the weight was recorded. 2 grams of dye (in solution) was added to the dish and the total weight of the dish and dye was recorded. The sample in the dish was then placed in a conventional oven preset at 110° C. for one hour. The sample was removed from the oven and cooled in a dessicator. The dish with residual solids was again weighed. The % Solids were then calculated in accordance with the following equation 1:

% Solids in Dye Solution={(Weight dish+residue)−weight dish)/(weight of sample)}×100   Equation 1:

As colorless compounds may be present in solution with the dye even after purification, absorbance tests of dye solutions were also carried out. Thus, an absorbance test gives a measure of the concentration of active colorant in an ink or dye solution. Results are given in absorbance units at specified wavelengths. As the concentration of dye in solution increases, the absorbance value increases proportionately. Absorbance tests were carried out on dyes and inks using the following method.

A microliter syringe was used to place an alloquote of ink or dye solution into a class A volumetric flask with a ground glass stopper, available from VWR Scientific Products, 1310 Goshen Pkwy, West Chester, Pa. 19380. In the case of 1:2000 dilutions, a 5 microliter alloquote of ink was transferred to a 10 ml volumetric flask using a Hamilton microliter #701 10 microliter hypodermic syringe, available from VWR Scientific Products, and made up to 10 ml using deionized water. In the case of 1:1000 dilutions, a 10 microliter alloquote of ink was transferred to a 10 ml volumetric flask using a Hamilton microliter #701 10 microliter hypodermic syringe, and made up to 10 ml using deionized water. In the case of 1:4000 dilutions, 25 microliters of ink or dye solution were transferred to a 100 ml volumetric flask using a Biohit Systems, Inc. 25 microliter fixed volume pipette, available from VWR Scientific Products, and made up to 100 ml using deionized water. In the case of 1:5000 dilutions, 5 microliters of ink or dye solution were transferred to a 25 ml volumetric flask using a Hamilton microliter #701 10 microliter hypodermic syringe. In the case of 1:10,000 dilutions, 5 microliters of ink or dye solutions were transferred to a 50 ml volumetric flask using a Hamilton microliter #701 10 microliter hypodermic syringe, and made up to 50 ml using deionized water. In the case of 1:500 dilutions, two 10 microliter alloquotes of ink or dye were transferred to a 10 ml volumetric flask using a Hamilton microliter #701 10 microliter hypodermic syringe, and made up to 10 ml using deionized water.

The filled volumetric flask was inverted at least six times to ensure adequate mixing. The diluted ink or dye solution was then analyzed using a Perkin-Elmer Lambda 2 UV/VIS dual beam spectrophotometer (Bodenseewerk, Perkin-Elmer GmbH, D-7770 Uberlingen, Germany) according to the following method. Matched 7Q quartz spectrophotometer cells, 10 mm pathlength, available from VWR Scientific Products (Cat #58016-276) were used for absorbance analysis. Background corrections were performed using deionized water in both the reference and sample beams. The diluted solution to be analyzed was placed in the sample curvette and replaced in the sample beam of the spectrophotometer, leaving the reference cell in place, and the spectrum scanned between 750 nm and 350 nm. The visible spectrum was recorded graphically, along with a table indicating the most significant peaks, their wavelength and absorbance value. The maximum absorbance value and wavelength were noted for each sample, along with the dilution ratio. In the case of colorants and inks that contained more than one peak in the visible spectrum, the absorbance value and wavelengths were noted for the most significant peaks. For example, the result $$0.1319 @ 669.6 \text{ nm and } 1.6178 @ 420 \text{ nm (dilution 1:2000)}$$

signifies that two peaks were apparent in the visible spectrum—one peak at 669.6 nanometers with an absorbance of 0.1319 absorbance units, and one at 420 nanometers with an intensity of 1.6178 absorbance units. The sample was prepared for analysis by diluting the initial sample two thousand times.

The quantity of dye in a sample of ink or dye solution may be determined by examining the absorbance at specified wavelengths taking into account the dilution factor. Absorbance is directly proportional to dye concentration, in accordance with the Beer-Lambert law in Equation 2:

$$ABS = \epsilon c l \qquad \text{Equation 2}$$

Where ABS stands for absorbance, $\epsilon$ is the Extinction Coefficient of the dye in l/mole/cm (a constant for a particular dye at a specific wavelength), l is the pathlength of the light shining through the sample usually in cm, and c represents concentration in moles/l or g/l. Thus, absorbance is directly proportional to dye concentration, and inversely proportional to the dilution ratio. Thus, in order to compare the concentrations of the same dye that were measured using differing dilution ratios, Equation 3 may be used.

$$ABS1 \times D1 = ABS2 \times D2 \qquad \text{Equation 3}$$

Where ABS1 is an absorbance reading at dilution factor D1, and ABS2 is an absorbance reading at dilution D2. Thus, the quantity of dye in various inks can be compared using absorbance values, once the dilution factor is taken into account.

EXAMPLE 1

(Turquoise)

| Component | Percent by Weight |
|---|---|
| Deionized water | 23.5% |
| Versene 100 XL | 1.3% |
| Glycerine | 3.5% |
| NMMO (as a 50% solution in water) | 7.0% |
| Cobratec 99 (a 33% solution in 50% aq. 2 pyrrolidone) | 0.3% |
| Proxel GXL | 0.3% |
| Surfynol 504 | 0.2% |
| Mixture mixed 15 minutes | |
| Procion Turquiose H-A25 soln. (desalinated, 25.96% solids) (Dye obtained from BASF. Absorbance after purification: 1.077 @ 666.3 nm, 0.615 @ 628 nm (1:10,000 dilution). Dye was pre-filtered using a 0.2 micron membrane filter prior to use. | 46.9% |

Mixture stirred for 45 mins and filtered using a 0.2 micron filter membrane.

Final ink absorbance: 0.5270 @ 666.7 nm and 0.2663 @ 627.8 nm; 1:10,000 dilution.

The approximate percent of dye solids in the ink can be calculated by multiplying the percent of solids in the desalinated dye solution by the percent by weight of the dye solution in the ink, and then multiplying the resulting product by 100. For Example 1, the percent dye solids in the ink would therefore be (0.2596×0.469)×100, or 12.18%.

It should be noted that the concentration of NMMO given in the examples refers to the amount of the "50% aqueous NMMO solution" added to the ink. For example, Example 1 actually contains 3.5% of NMMO, that is 7% of a "50% aqueous NMMO solution".

Example 1 was made up, used to fill a Colorspan 0900400-300 cartridge and print tested using a Colorspan DM XII color printer. Example 1 proved to be print stable, in that it printed without print delay and without negative effect in the print image. The filtration index of this ink after storing at 50° C. was not tested, as the viscosity was a little high, and so reformulation was imminent. However, this ink printed well and prints were used in further color measurement tests. Example 9 is a Turquoise ink formula derived from ink Example 1, that was tested using the filtration index test.

EXAMPLE 2

(Golden Yellow)

| Component | Percent by Weight |
|---|---|
| Deionized water | 54.2% |
| Versene 100 XL | 0.6% |
| Disodium EDTA | 0.3% |
| Warmed and stirred to solution at 40° C. | |
| Glycerine | 3.5% |
| NMMO (50% solution in water) | 7.0% |
| Polyethylene glycol 400 | 1.0% |
| Cobratec 99 (a 33% solution in 50% aq. 2 pyrrolidone) | 0.3% |
| Proxel GXL | 0.3% |
| Surfynol 504 | 0.1% |
| Surfynol 465 | 0.1% |
| Mixture mixed 15 minutes | |
| Procion Orange PX-2R soln. (desalinated, 23.14% solids) (Dye from BASF. Absorbance after purification: 1.132 @ 488.5 nm; 1:10,000 dilution) | 3.4% |
| Cibacron Yellow P-6GS Soln (desalinated, 22.05% solids) (Dye from Ciba, absorbance after purification: 0.825 @ 421.5 nm; 1:10,000 dilution) | 29.2% |

Ink was mixed for 45 minutes, then filtered through a 0.2 micron membrane filter.
Absorbance of final ink: 0.5105 @ 422.5 nm (1:5000 dilution).
Ink of Example 2 printed well, and passed the filtration test, giving a filtration index of 0.90 after storage at 50° C. for one week.

EXAMPLE 3

(Scarlet)

| Component | Percent by Weight |
|---|---|
| Deionized water | 45.8% |
| Versene 100 XL | 0.6% |
| Disodium EDTA | 0.3% |
| Warmed and stirred to solution at 40° C. until solids were dissolved, | |
| Glycerine | 3.5% |
| NMMO (50% solution in water) | 24.0% |
| Cobratec 99 (a 33% solution in 50% aq. 2 pyrrolidone) | 0.3% |
| Proxel GXL | 0.3% |
| Surfynol 504 | 0.1% |
| Surfynol 465 | 0.1% |
| Mixture mixed 15 minutes | |
| Procion Scarlet H-RMA soln. (desalinated, 17.06% solids) (Dye from BASF. Absorbance after purification: 0.613 @ 507.7 nm (1:10,000 dilution)) This dye was prefiltered before use using a 0.2 micron membrane filter | 21.0% |

Mixture stirred for 45 minutes, then filtered using a 0.2 micron membrane filter.
Final ink absorbance results: 0.6041 @ 507 nm and 0.1858 @ 376.5 nm (1:2000 dilution)
Example 3 gave a scarlet red colored ink that passed the filtration test, and printed well in the Colorspan DM12 printer. Filtration index was 0.93 after 1 week at 50° C.

EXAMPLE 4

(Yellow)

| Component | Percent by Weight |
|---|---|
| Deionized water | 36.5% |
| Versene 100 XL | 0.6% |
| Disodium EDTA | 0.3% |
| Warmed and stirred to solution at 40° C. to dissolve solids | |
| Glycerine | 3.5% |
| NMMO (50% solution in water) | 7.0% |
| Cobratec 99 (a 33% solution in 50% aq. 2 pyrrolidone) | 0.3% |
| Proxel GXL | 0.3% |
| Surfynol 504 | 0.1% |
| Surfynol 465 | 0.1% |
| Mixture mixed 15 minutes | |
| Cibacron Yellow P-6GS Soln (desalinated, 22.95% solids) (Dye from Ciba, absorbance after purification: 0.825 @ 421.5 nm (1:10,000 dilution)) | 51.3% |

Mixture was stirred for 45 minutes, then filtered through a 0.2 micron membrane filter.
Final ink absorbance was 0.4514 @ 421.6 nm (1:10,000 dilution).
Ink of Example 4 ran well in the Colorspan DM12 and made bright yellow prints on fabric. The ink passed the filtration test, with a Filtration Index of 0.92 after 1 week storage at 50° C.

EXAMPLE 5

(Orange)

| Component | Percent by Weight |
|---|---|
| Deionized water | 47.5% |
| Versene 100 XL | 0.6% |
| Disodium EDTA | 0.3% |
| Warmed and stirred to solution at 40° C. until solids were dissolved. | |
| Glycerine | 3.5% |
| NMMO (50% solution in water) | 7.0% |
| Cobratec 99 (a 33% solution in 50% aq. 2 pyrrolidone) | 0.3% |
| Proxel GXL | 0.3% |
| Surfynol 504 | 0.1% |
| Surfynol 465 | 0.1% |
| Mixture mixed 15 minutes | |
| Procion Orange PX-2R soln. (desalinated, 23.14% solids) (Dye from BASF. Absorbance after purification: 1.132 @ 488.5 nm (1:10,000 dilution)) | 40.3% |

Mixture stirred for 45 minutes, then filtered through a 0.2 micron membrane.
Ink of Example 5 printed well, and gave a filtration index of 0.96 after 1 week of storage at 50° C. The absorbance of the ink of Example 5 was 1.1456 @487.5 nm (1:4000 dilution)

EXAMPLE 6
(Medium Turquoise)

| Component | Percent by Weight |
|---|---|
| Deionized water | 76.4% |
| Versene 100 XL | 0.6% |
| Disodium EDTA | 0.3% |
| Warmed and stirred to solution at 40° C. until solids dissolved. | |
| Glycerine | 3.5% |
| NMMO (50% solution in water) | 7.0% |
| PEG-400 | 2.0% |
| PEG-600 | 3.0% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes | |
| Procion Turquoise H-A25 soln. (desalinated, 25.96% solids) (Dye from BASF. Absorbance after purification: 1.077 @ 628 nm and 0.615 @ 628 nm (1:10,000 dilution)) The dye solution was prefiltered using a 0.2 micron filter prior to use. | 6.4% |

Mixture was stirred 45 minutes, then filtered through a 0.2 micron membrane filter.

Ink of Example 6 printed well, and gave a Filtration Index of 0.96 after storage at 50° C. for one week. The ink had an absorbance of 0.3681 @666.4 nm and 0.2041 @ 629.4 nm (1:2000 dilution).

EXAMPLE 7
(Gray)

| Component | Percent by Weight |
|---|---|
| Deionized water | 75.7% |
| Versene 100 XL | 0.6% |
| Disodium EDTA | 0.3% |
| Warmed and stirred to solution at 40° C. | |
| Glycerine | 3.5% |
| NMMO (50% solution in water) | 7.0% |
| PEG-400 | 2.0% |
| PEG-600 | 3.0% |
| Cobratec (as a 33% solution in 50% aq. 2 pyrrolidone) | 0.3% |
| Proxel GXL | 0.3% |
| Surfynol 504 | 0.1% |
| Mixture mixed 15 minutes | |
| Cibacron Grey P-AS soln. (desalinated, 18.89% solids) (Dye from Ciba. Absorbance after purification: 0.387 @ 589.2 nm (1:10,000 dilution)) | 7.2% |

Mixture was stirred 45 minutes, then filtered through a 0.2 micron membrane filter.

The ink of Example 7 gave an ink that printed well. Neither the absorbance nor the Filtration Index after storage were tested.

EXAMPLE 8
(Green)

| Component | Percent by Weight |
|---|---|
| Deionized water | 46.3% |
| Versene 100 XL | 0.6% |
| Disodium EDTA | 0.3% |
| Warmed and stirred to solution at 40° C. to dissolve solids. | |
| Glycerine | 3.5% |
| NMMO (50% solution in water) | 7.0% |
| PEG-400 | 1.0% |
| Cobratec (as a 33% solution in 50% aq. 2 pyrrolidone) | 0.3% |
| Proxel GXL | 0.3% |
| Surfynol 504 | 0.1% |
| Mixture mixed 15 minutes | |
| Procion Turquoise H-A25 soln. (desalinated, 25.96% solids) (Dye from BASF. Absorbance after purification: 1.077 @ 628 nm and 0.615 @ 628 nm (1:10,000 dilution). The dye solution was prefiltered using a 0.2 micron filter prior to use. | 2.1% |
| Cibacron Yellow P-6GS soln. (desalinated, 22.05% solids) (Dye supplied by Ciba. Absorbance after purification: 0.825 @ 421.5 nm) | 38.5% |

Mixture was stirred 45 minutes, then filtered through a 0.2 micron membrane filter.

Ink of Example 8 printed well to give green prints. The ink passed the Filtration Index test, giving a Filtration Index of 0.90 after 1 week at 50° C., with no particles visible on the filter membrane at the end of the test. The absorbance of the final ink was 0.1319 @ 669.6 and 1.6178 @ 420.3 at 1:2000 dilution.

EXAMPLE 9
(Turquoise)

| Component | Percent by Weight |
|---|---|
| Deionized water | 33.4% |
| Versene 100 XL | 0.6% |
| Disodium EDTA | 0.3% |
| Warmed and stirred to solution at 40° C. to dissolve solids. | |
| Glycerine | 3.0% |
| NMMO (as a 50% solution in water) | 15.0% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes | |
| Procion Turquoise H-A25 soln. (desalinated, 25.96% solids) (Dye from BASF. Absorbance after purification: 1.077 @ 628 nm and 0.615 @ 628 nm (1:10,000 dilution). The dye solution was prefiltered using a 0.2 micron filter prior to use. | 46.9% |

Mixture was stirred 45 minutes, then filtered through a 0.2 micron membrane filter.

Ink of Example 9 printed well to give turquoise prints. The ink passed the Filtration Index test, giving a Filtration Index of 0.97 after 1 week at 50° C., with no particles visible on the filter membrane at the end of the test. The absorbance of the final ink was 0.5385 @ 666.5 nm and 0.2925 @ 627.8 nm using 1:10,000 dilution.

Comparative Example 1

(Turquoise)

| Component | Percent by Weight |
| --- | --- |
| Deionized water | 31.1435% |
| N-methylpyrrolidone | 4.975% |
| Diethylene Glycol | 3.4825% |
| Versene 100 XL | 0.897% |
| Disodium EDTA | 0.4985% |
| Warmed and stirred to solution at 40° C. until solids dissolved | |
| Glycerine | 3.4825% |
| Cobratec (as a 33% solution in 50% aq. 2 pyrrolidone) | 0.2985% |
| Proxel GXL | 0.2985% |
| Surfynol 504 | 0.199% |
| Mixture mixed 15 minutes | |
| Procion Turquoise H-A25 soln. (desalinated, 24.15% solids) (Dye from BASF. Absorbance after purification: 0.923 @ 666.4 nm) The dye solution was prefiltered using a 0.2 micron filter prior to use. | 54.725% |

Mixture was stirred 45 minutes, then filtered through a 0.2 micron membrane filter.

Ink absorbance was 0.523 @ 666 nm and 0.282 @ 628 nm, indicating that the amounts of dye in Comparative Example 1 is comparable to that contained in Examples 1 and 9. This ink printed well enough for color measurement tests, however the filtration index test gave a Filtration Index of 0.84, which is a low pass, even with higher concentrations of EDTA contained in the ink.

Comparative Example 2

(Golden Yellow)

| Component | Percent by Weight |
| --- | --- |
| Deionized water | 48.3% |
| Ethylene Glycol | 3.0% |
| Glycerine | 2.0% |
| N-methylpyrrolidone | 5.0% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture stirred at 40° C. until solids dissolved, allowed to cool | |
| Cibacron Yellow P6GS soln. (desalinated, 18.35% solids) (Dye from Ciba. Absorbance after purification: 0.686 @ 422 nm (1:10,000 dilution)) | 36% |
| Procion Orange PX-2R 40 soln. (desalinated, 20.22% solids) (Dye from BASF. Absorbance after dilution 0.948 @ 488.2 nm (1:10,000 dilution)) | 4.0% |

Mixture was stirred 45 minutes, then filtered through a 0.2 micron membrane filter.

Absorbance of the final ink was 0.502 @422 nm (1:5000 dilution). The ink passed the filtration test after 1 week storage at 50° C., however prints made using the ink on Kimberly-Clark Cotton-Poplin were not as visually bright as those made using the ink of Example 2.

Comparative Example 3

(Scarlet)

| Component | Percent by Weight |
| --- | --- |
| Deionized water | 63.3% |
| Tetramethylene Sulfone | 12.0% |
| Glycerine | 2.0% |
| Disodium EDTA | 0.3% |
| Versene 100 XL | 0.6% |
| Cobratec (as a 33% solution in 50% aq. 2 pyrrolidone) | 0.3% |
| Proxel GXL | 0.3% |
| Surfynol 504 | 0.2% |
| Mixture mixed for 10 minutes, | |
| Procion Scarlet H-RMA 25 soln. (desalinated, 17.06% solids) (Dye from BASF. Absorbance after purification: 0.613 @ 507.7 nm (Dilution 1:10,000) The dye solution was prefiltered using 0.2 micron filter prior to use. | 21.0% |

Mixture was heated to 40° C. with stirring, then allowed to cool over 45 minutes, then filtered through a 0.2 micron membrane filter.

Final absorbance of the ink was 0.6083 @ 507.6 nm and 0.212 @ 377.6 nm (1:2000 dilution). The ink was stable, giving a Filtration Index of 0.96, however, the color produced when printed and steamed on 100% Cotton Poplin 133×72 thread count (Kimberly-Clark Production #502-101-xxxx fabric) was not as visually bright as prints made using ink of Example 3.

Comparative Example 4

(Yellow)

| Component | Percent by Weight |
| --- | --- |
| Deionized water | 31.3% |
| N-methyl pyrrolidone | 5.0% |
| Diethylene Glycol | 3.5% |
| Glycerine | 3.5% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes at 40° C., | |
| Cibacron Yellow P-6GS soln. (desalinated, 18.35% solids) (Dye from Ciba. Absorbance after purification; 0.686 @ 422 nm) The dye solution was prefiltered using a 0.2 micron filter prior to use. | 55.0% |

Mixture was stirred 1 hour, then filtered through a 0.2 micron membrane filter.

This ink passed the filtration index test, with a Filtration Index of 0.97. The absorbance of the final ink was 0.381 @ 442 nm (1:10,000 dilution), indicating that the dye concentration in this ink was comparable to that of Example 4, yet Example 4 gave a brighter color (shown by increased L* values in Tables 1 and 2 as measured using the Hunter apparatus as previously described) when printed onto cotton and steamed.

Comparative Example 5

(Orange)

| Component | Percent by Weight |
|---|---|
| Deionized water | 46.0% |
| N-methyl pyrrolidone | 5.0% |
| Diethylene Glycol | 3.5% |
| Glycerine | 3.5% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes at 40° C., | |
| Procion Orange PX-2R soln. (desalinated, 23.14% solids) (Dye from BASF. Absorbance after purification; 1.132 @ 488.5 nm (1:10,000 dilution)) The dye solution was pre-filtered using a 0.2 micron filter prior to use. | 40.3% |

Mixture was stirred 1 hour, then filtered through a 0.2 micron membrane filter.

This ink had a final ink absorbance of 0.8194 @ 488 nm and 0.273 @ 378 nm (1:5000 dilution). This ink printed well in a Colorspan DM XII, and gave a Filtration Index of 0.85 (a low pass) after storage for 1 week at 50° C. However, when printed on Kimberly-Clark Printing Technology Cotton Poplin Production #502-101-xxxxx and steamed (25 Mins) gave a duller color than the ink of Example 5, as indicated by the lower L* values given in Tables 1 and 2.

Comparative Example 6

(Medium Turquoise)

| Component | Percent by Weight |
|---|---|
| Deionized water | 79.9% |
| N-methyl pyrrolidone | 5.0% |
| Diethylene Glycol | 3.5% |
| Glycerine | 3.5% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes at 40° C., | |
| Procion Turquoise H-A25 soln. (desalinated, 25.96% solids) (Dye from BASF. Absorbance after purification: 1.077 @ 666.3 nm and 0.615 @ 628 nm (dilution 1:10,000)) The dye solution was prefiltered using a 0.2 micron filter prior to use. | 6.4% |

Mixture was stirred 1 hour, then filtered through a 0.2 micron filter.

The final ink had an absorbance of 0.3411 @ 666.5 nm and 0.1783 @ 628.7 nm (dilution 1:2000). This ink was stable, giving a Filtration Index of 0.92 after 1 week of storage at 50° C.

Comparative Example 7

(Grey)

| Component | Percent by Weight |
|---|---|
| Deionized water | 77.3% |
| N-methyl pyrrolidone | 5.0% |
| Diethylene Glycol | 3.5% |
| Glycerine | 3.5% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture warmed to 40° C., | |
| Cibacron Grey P-AS soln. (desalinated, 15.62% solids) (Dye from Ciba. Absorbance from purification: 0.307 @ 590.2 nm (1:10,000 dilution)) | 9.0% |

Mixture was stirred 1 hour, allowed to cool, then filtered through a 0.2 micron filter.

Final ink absorbance was 0.535 @590 nm (1:500 dilution). This ink was stable, giving a Filtration Index of 0.95 after storing for 1 week at 50° C., however, gave prints on Cotton Poplin that were less bright compared to Example 7 after steaming.

Comparative Example 8

(Green)

| Component | Percent by Weight |
|---|---|
| Deionized water | 36.3% |
| N-methyl pyrrolidone | 3.0% |
| Glycerine | 2.0% |
| Tetramethylene sulfone | 7.0% |
| Versene 100 XL | 0.6% |
| Disodium EDTA | 0.3% |
| Cobratec (as a 33% solution in 50% aq. 2 pyrrolidone) | 0.3% |
| Proxel GXL | 0.3% |
| Surfynol 504 | 0.2% |
| Mixture mixed 15 minutes at 40° C., | |
| Cibacron Yellow P-6GS soln. (desalinated, 18.35 % solids) (Dye obtained from Ciba. Absorbance after purification: 0.686 @ 422 nm) | 47.5% |
| Procion Turquoise H-A25 soln. (desalinated, 24.15% solids) (Dye obtained from BASF. Absorbance after purification: 0.923 @ 666.4 nm and 0.521 @ 629 nm Dye solution was pre-filtered through a 0.2 micron filter before use) | 2.5% |

Mixture was stirred 1 hour, allowed to cool, then filtered through a 0.2 micron membrane filter.

This ink printed well and was stable, giving a Filtration Index of 0.96 after storage for 1 week at 50° C. The final ink absorbance was 0.628 @ 421 nm (1:5000 dilution). The ink printed well, but produced prints that were duller than inks for Example 8 on Kimberly-Clark Printing Technology Cotton-Poplin. Even though absorbance measurements suggested that this ink contained slightly less dye than the Inventive Example green ink (Example 8), the inventive example gave prints on fabric that had a higher L* value and were visually brighter than those produced using ink of Comparative Example 8.

Ink Examples 1 through 8 and ink Comparative Examples 1 through 8 were filled into thermal cartridges (Colorspan part #0900400-300) and printed onto Kimberly-Clark Printing Technology Cotton Poplin (Production #502-101-xxxxx) using a Colorspan DM XII printer. Inks were printed in 100% laydown mode and 200% laydown mode. The backing from the printed fabric was removed, and the fabric was steamed for 25 minutes at 100° C. using a Jacquard Vertical Steamer. The resulting prints were examined visually and in all cases, prints made using the inventive inks appeared visually brighter than those produced using the corresponding comparative inks. In most cases, color measurement gave physical data that concurred with the visual color sensation of the prints. The colors of the prints were measured and are shown in Table 1 (100% ink laydown) and Table 2 (200% ink laydown). Data contained in Tables 1 and 2 are average readings of 3 measurements.

Table 1. Color coordinates of steamed prints on Kimberly-Clark Cotton Poplin fabric in CIE L*a*b* colorspace, using D-65 illuminant and 10 degree observer on the equipment previously described. Average of three measurements. Prints were made using 100% 4-pass print mode.

TABLE 1

Color coordinates of steamed prints on Kimberly-Clark Cotton Poplin fabric in CIE L*a*b* colorspace, using D-65 illuminant and 10 degree observer on the equipment previously described. Average of three measurements. Prints were made using 100% 4-pass print mode.

| COLOR | CO-SOLVENT | LAYDOWN | L* | a* | b* |
| --- | --- | --- | --- | --- | --- |
| Gray | Example 7 | 100% | 39.32 | −8.16 | −10.72 |
|  | Comparative Ex 7 | 100% | 34.25 | −7.78 | −10.64 |
| Green | Example 8 | 100% | 66.12 | −31.03 | 73.13 |
|  | Comparative Ex 8 | 100% | 63.91 | −31.02 | 73.02 |
| Orange | Example 5 | 100% | 52.77 | 58.92 | 63.7 |
|  | Comparative Ex 5 | 100% | 54.06 | 58.92 | 64.59 |
| Turquoise | Example 1 | 100% | 41.35 | −26.89 | −32.76 |
|  | Comparative Ex 1 | 100% | 39.56 | −24.73 | −33.18 |
| Scarlet | Example 3 | 100% | 47.14 | 59.38 | 30.23 |
|  | Comparative Ex 3 | 100% | 45.83 | 59.82 | 27.73 |
| Golden Y | Example 2 | 100% | 67.65 | 43.46 | 82.03 |
|  | Comparative Ex 2 | 100% | 66.51 | 45.46 | 82.89 |
| Yellow | Example 4 | 100% | 82.69 | 4.68 | 102.26 |
|  | Comparative Ex 4 | 100% | 82.09 | 4.34 | 103.23 |
| Med. Turquoise | Example 6 | 100% | 63.11 | −37.32 | −30.95 |
|  | Comparative Ex 6 | 100% | 63.9 | −36.73 | −32.57 |

Table 2. Color coordinates of steamed prints on Kimberly-Clark Cotton Poplin fabric in CIE L*a*b* colorspace, using D-65 illuminant and 10 degree observer using the previously described equipment. Prints were made using 200% 8-pass print mode.

TABLE 2

Color coordinates of steamed prints on Kimberly-Clark Cotton Poplin fabric in CIE L*a*b* colorspace, using D-65 illuminant and 10 degree observer using the previously described equipment. Prints were made using 200% 8-pass print mode.

| Color | Co-solvent | laydown | L* | a* | b* |
| --- | --- | --- | --- | --- | --- |
| Gray | Example 7 | 200% | 34.86 | −6.23 | −8.83 |
|  | Comparative Ex 7 | 200% | 27.91 | −5.25 | −8.66 |
| Green | Example 8 | 200% | 56.2 | −30.85 | 60.15 |
|  | Comparative Ex 8 | 200% | 54.84 | −30.3 | 59.46 |
| Orange | Example 5 | 200% | 46.72 | 55.89 | 56.04 |
|  | Comparative Ex 5 | 200% | 49.4 | 58.93 | 60.37 |
| Turquoise | Example 1 | 200% | 31.21 | −18.2 | −30.12 |
|  | Comparative Ex 1 | 200% | 30.19 | −15.89 | −29.66 |
| Scarlet | Example 3 | 200% | 41.52 | 57.37 | 31.34 |
|  | Comparative Ex 3 | 200% | 41.88 | 60.11 | 34.92 |
| Golden Y | Example 2 | 200% | 62.46 | 48.25 | 76.04 |
|  | Comparative Ex 2 | 200% | 60.59 | 49.23 | 74.6 |
| Yellow | Example 4 | 200% | 79.2 | 10.62 | 99.05 |
|  | Comparative Ex 4 | 200% | 79.03 | 8.93 | 98.74 |

Note that prints made using Inventive Example inks appeared visually brighter to the human eye than those made using the Comparative Example Inks, and in most cases, the color measurement data presented in Tables 1 and 2 concurs with the visual impression. In every case except for Examples 5 and 6, a higher L* (luminosity) value was obtained when NMMO was included in the inks, demonstrating that the prints were visually brighter.

Comparative Example 9

| Component | Percent by Weight |
| --- | --- |
| Deionized water | 23.9% |
| Glycerine | 3.5% |
| N-methyl pyrrolidone | 5.0% |
| Diethylene Glycol | 3.5% |
| Proxel GXL | 0.3% |
| Surfynol 504 | 0.2% |
| Cobratec (33% solution in 50% aq. 2 pyrrolidone) | 0.3% |
| Versene 100 XL | 0.6% |
| Disodium EDTA | 0.3% |
| Procion Brilliant Blue PX 3R 40 soln.(desalinated, 10.7% solids) | 62.4 % |

This ink did not start up well when printed, but passed the Filtration test (0.95 filtration index after 1 week at 50° C.).

Comparative Example 10

| Component | Percent by Weight |
| --- | --- |
| Deionized water | 36.3% |
| Glycerine | 3.5% |
| N-methyl pyrrolidone | 3.5% |
| Diethylene Glycol | 3.5% |
| Proxel GXL | 0.3% |
| Surfynol 504 | 0.2% |
| Versene 100 XL | 0.6% |
| Disodium EDTA | 0.3% |
| Cobratec (33% solution in 50% aq. 2 pyrrolidone) | 0.3% |
| Procion Brilliant Blue PX 3R 40 soln.(desalinated, 10.7% solids) | 50.0% |

This ink did not start up well, and failed the Filtration test.

Comparative Example 11

| Component | Percent by Weight |
| --- | --- |
| Deionized water | 58.1% |
| Glycerine | 2.0% |
| Tetramethylene Sulfone | 12.0% |
| Proxel GXL | 0.3% |
| Surfynol 504 | 0.2% |
| Cobratec (as a 33% solution in 50% 2-pyrrolidone/water) | 0.3% |
| Versene 100 XL | 0.6% |
| Disodium EDTA | 0.3% |
| Stir and warm to 40° C., then add Liquid, desalinated, Procion Scarlet H-RMA 25 soln. (12.58% solids) (dye solution was filtered thorough a 0.2 micron filter membrane prior to use) | 26.2% |

Stir at 40° C. for 1 hour, then filtered through a 0.45 micron membrane, followed by a 0.2 micron membrane. Same membranes were used.

The Filtration Index of this ink after 1 week at 50° C. was 0.79.

Comparative Example 12

| Component | Percent by Weight |
|---|---|
| Deionized water | 39.3% |
| Ethylene Glycol | 3.0% |
| Glycerine | 3.0% |
| Dowanol PM | 3.0% |
| Proxel GXL | 0.3% |
| Versene 100 XL | 0.6% |
| Disodium EDTA | 0.3% |
| Surfynol 504 | 0.2% |
| Cobratec (as a 33% solution in 50% 2-pyrrolidone/water) | 0.3% |
| Stir and warm to 40° C., then add | |
| Liquid, desalinated, | |
| Procion Turquoise HA 25 soln. (24.15% solids) | 2.5% |
| Cibacron Yellow P6GS Liq. 33 soln. (18.35% solids) | 47.5% |
| (dye solutions were filtered thorough a 0.2 micron filter membrane prior to use) | |

Mixture was stirred at 40° C. for 1 hour, then filtered through a 0.45 micron membrane, followed by a 0.2 micron membrane. Dowanol PM, a propylene glycol monomethylether (humectant and cosolvent) was obtained from the Gallade Chemical Co., Inc., Santa Ana, Calif.

The Filtration Index of this ink after 1 week at 50° C. was 0.98, however a significant quantity of sediment was present on the filter membrane after carrying out the Filtration Test (enough that it could be scraped with a spatula), suggesting that large particulates were being generated that would clog the nozzles of an ink jet printer. Thus, the ink was not stable and would lead to deterioration of print quality as the ink aged.

While the invention has been described in detail with particular reference to a preferred embodiment thereof, it should be understood that many modifications, additions and deletions can be made thereto without departure from the spirit and the scope of the invention as set forth in the following claims.

We claim:

1. An ink jet ink comprising:
   a) water;
   b) N-methylmorpholine-N-oxide;
   c) at least about 0.5 percent by weight of dye solids.

2. The ink jet ink of claim 1 wherein said N-methylmorpholine-N-oxide is present in an amount between about 0.5 and 20 percent by weight.

3. The ink jet ink of claim 2 wherein said N-methylmorpholine-N-oxide is present in an amount between about 1 to 12 percent by weight.

4. The ink jet ink of claim 1 wherein said dye solids are present in an amount of between about 0.5 and 20 percent by weight.

5. The ink jet ink of claim 1 wherein said dye solids are present in an amount greater than about 4.0 percent by weight.

6. The ink jet ink of claim 1 wherein said dye is selected from the group consisting of reactive, acid, direct, and basic dye classes.

7. The ink jet ink of claim 6, wherein said dye is selected from the group consisting of reactive and acid dyes.

8. The ink jet ink of claim 1 further including a humectant.

9. The ink jet ink of claim 8 wherein the humectant is present in an amount between about 0.5 and 20 percent by weight.

10. The ink jet ink of claim 8 wherein said humectant is selected from the group consisting of ethylene glycol, diethylene glycol, glycerine, and polyethylene glycol 200, 400, and 600, propane-1,3-diol, propylene glycol monomethyl ether, a glycol, a diol, and polyhydric alcohols.

11. The ink jet ink of claim 10 wherein said humectant is a glycol.

12. The ink jet ink of claim 10 wherein said humectant is a polyhydric alcohol.

13. The ink jet ink of claim 10 wherein said humectant is a diol.

14. The ink jet ink of claim 1 wherein said water is present in an amount of between about 20.0 to 95 percent by weight.

15. The ink jet ink of claim 1 further comprising at least one additional co-solvent.

16. The ink jet ink of claim 15 wherein said at least one additional co-solvent is present in an amount of between about 1 to 12 percent by weight.

17. An ink jet ink comprising:
   a) water in an amount of between about 20 and 95 percent by weight;
   b) N-methylmorpholine-N-oxide co-solvent in an amount between about 0.5 and 20 percent by weight;
   c) at least about 0.5 percent by weight of dye solids.

18. The ink jet ink of claim 17 further comprising a humectant.

19. The ink jet ink of claim 17 further comprising at least one additional co-solvent.

20. An aqueous ink jet ink comprising:
   N-methylmorpholine-N-oxide; and
   a dye.

21. The aqueous ink jet ink of claim 20, wherein said N-methylmorpholine-N-oxide is present in an amount between about 0.5 and 20.0 percent by weight.

22. The ink jet ink of claim 20 wherein said N-methylmorpholine-N-oxide is present in an amount between about 1 to 12 percent by weight.

23. The aqueous ink jet ink of claim 20, wherein said dye is present in an amount between about 0.5 and 20 percent by weight of dye solids.

24. The ink jet ink of claim 20 wherein said dye solids are present in an amount greater than about 4.0 percent by weight.

25. The aqueous ink jet ink of claim 20, wherein said dye is selected from either reactive, acid, direct, or basic dyes.

26. The aqueous ink jet ink of claim 25, wherein said dye is selected from either reactive or acid dyes.

27. The aqueous ink jet ink of claim 20, further including at least one additional co-solvent.

28. The aqueous ink jet ink of claim 20, further including a humectant.

29. The aqueous ink jet ink of claim 20, further comprising an additive selected from the group consisting of chelating agents, corrosion inhibitors, biocides, surfactants or pH stabilizers, buffers, viscosity modifiers, defoaming agents, or combinations thereof.

30. A method of printing a textile substrate comprising:
   providing an ink jet ink comprising
   a) water;
   b) N-methylmorpholine-N-oxide co-solvent;
   c) at least about 0.5 percent by weight of dye solids; and
   printing said ink jet ink through an ink jet printer onto a textile substrate.

31. A textile substrate printed in accordance with the method of claim 30.

* * * * *